B. MERRITT.
Balance-Wheel Connecting Device.

No. 225,068.　　　　Patented Mar. 2, 1880.

WITNESSES
Frank G. Parker
Ernest N. Boyden

INVENTOR
Benjamin Merritt

UNITED STATES PATENT OFFICE.

BENJAMIN MERRITT, OF NEWTON, ASSIGNOR OF ONE-HALF OF HIS RIGHT TO MELVIN L. WHITE, OF BOSTON, MASSACHUSETTS.

BALANCE-WHEEL CONNECTING DEVICE.

SPECIFICATION forming part of Letters Patent No. 225,068, dated March 2, 1880.

Application filed December 26, 1879.

*To all whom it may concern:*

Be it known that I, BENJAMIN MERRITT, of Newton, in the county of Middlesex and State of Massachusetts, have invented a certain new and useful Improved Balance-Wheel Connecting Device, of which the following is a specification.

The nature of my invention consists in so arranging the balance or momentum wheel of a machine in relation to its shaft and the belt and belt-shipping device that when the belt is shipped from the driving or fast pulley to the loose pulley the momentum-wheel is free to revolve independently of the shaft, the object being to enable the operator to stop his machine instantly without being obliged to overcome the impetus of the momentum-wheel. In other words, the operating parts of the machine may stop while the momentum-wheel is at its full speed.

Figure 1:
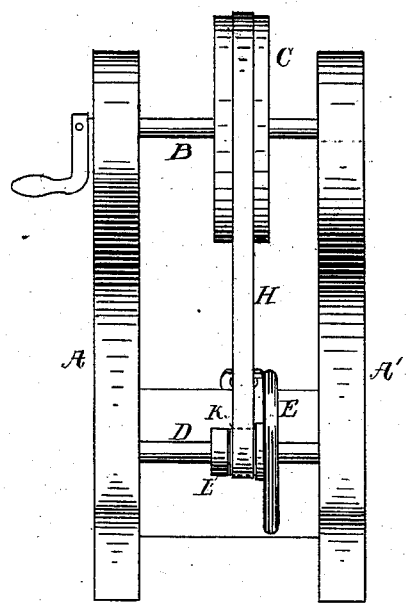
Figure 2:
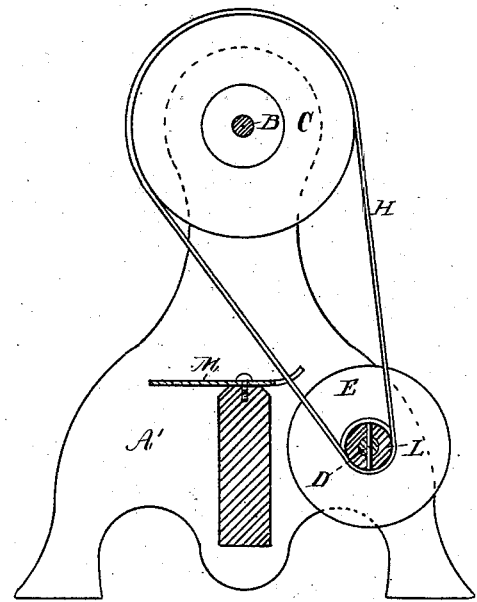
Figure 3:
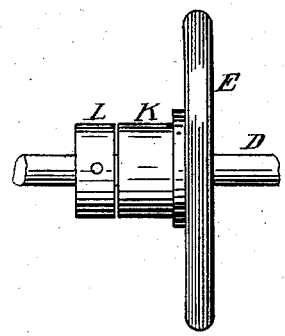

Referring to the drawings, Figure 1 is an elevation of my invention. Fig. 2 is a cross vertical section of my invention. Fig. 3 is a detail view, showing the driving-shaft, the fast pulley and the loose pulley, and the momentum-wheel.

Let A A' represent the frame-work of my device. The shaft B and its pulley C take the place of counter-shaft and pulley, from which power is transmitted by the belt H to the driving-shaft D of the machine to be operated.

On the shaft D, I affix a pulley, L, which is so fastened that it cannot turn except with the shaft D.

The pulley K is a mate for the pulley L, and is loose on the shaft D, but rigidly attached to the momentum-wheel E, so that both must revolve together, whether with or without the shaft D.

The belt H is somewhat narrower than the pulley C, so that it may be pressed by the shipper M onto the pulley L, although it is never to be thrown entirely off from the pulley K.

The operation of my device is as follows: When the machine to which it is to be applied is not in use the belt H is in the position shown in Fig. 1—that is, the loose pulley K and the momentum-wheel E are in motion, but the shaft is at rest. To start the machine the belt H is shipped so as to cover the pulley L. This causes the machine to operate, and as the belt H is also on the pulley K at the same time that it is on the pulley L, the impetus of the momentum-wheel E is utilized both for starting the machine and for steadying it while in motion.

To stop the machine the belt H is shipped wholly onto the pulley K. This instantly frees the machine from the action of the belt, and also from the momentum of the wheel E, so that the machine stops at once.

I claim as my invention—

In a mechanical device involving the use of a balance or momentum wheel, the combination of the shaft D and its fixed pulley L with the momentum-wheel E and its affixed pulley K, all operated by the belt H, substantially as described, and for the purpose set forth.

BENJAMIN MERRITT.

Witnesses:
FRANK G. PARKER,
ERNEST N. BOYDEN.